INVENTORS
ALBERT APPLETON and
RICHARD ARTHUR COLLINGE

BY Jewett, Mead & Browne

ATTORNEYS

Patented May 6, 1952

2,595,560

UNITED STATES PATENT OFFICE 2,595,560

DEVICE FOR FORMING ARTICLES FROM PLASTIC SHEET OR WEB MATERIALS

Albert Appleton and Richard Arthur Collinge, Earlestown, Newton-le-Willows, England, assignors to T. & T. Vicars Limited, Newton-le-Willows, England, a British company Application February 3, 1949, Serial No. 74,408
In Great Britain February 7, 1948

1 Claim. (Cl. 107—26)

The present invention concerns devices for forming articles from plastic dough sheet or web material in the making of baker's dough products, such as crackers, biscuits or the like. It concerns particularly devices which are suitable for the formation of articles such as dough laminae to be subsequently baked into biscuits, which are severed from a dough sheet or web.

Previously, as shown in H. Danger, German Patent Number 101,218 such devices comprise a hollow cutting shell with coaxial embossing means slidably disposed therein each of these being activated by an independent head which is normally adapted to reciprocate. It was possible, therefore, for relative movement to take place between the shell and the embossing member. In addition it has been usual for docker pins to be fixed to the embossing face of the embossing member, the purposes of these faces being to pierce the lamina which was carried beneath the cutters, usually on a conveyor web. The disadvantage of this arrangement is that if the depth of impression of the embossing machine is required to be adjusted then the depth of impression of the docker pins is similarly affected. If the docker pins were previously adjusted correctly then on further adjustment they either fail to pierce through the dough lamina or alternatively, pierce through it and into the conveyor beneath. This may lead to damage being caused to the conveyor or may cause the conveyor itself to be picked up by the pins and the continuous process to be interfered with.

An object of the present invention is to provide docker pins whose position is independent of any adjustment of the embossing means.

A further object is to enable the embossers to perform as part of their function an ejection operation.

A still further object is to enable the numbers and position of the docker pins to be easily altered.

According to the present invention a device for forming articles from sheet or web dough material comprises a cutting member, docker pins attached to a part thereof and an embossing member coaxially disposed within said cutting member, said members having means whereby they may be moved independently of each other.

Preferably, the said part of the cutting member consists of a detachable end portion thereof disposed between a shell portion of the cutting member and an activating head. The embossing member may have a reduced diameter portion which is slidably mounted through the cutter end portion or stud and thereafter attached to a further activating head or embossing stud whilst the docker pins extend longitudinally and slidably through apertures in a large diameter portion in the embossing member.

The invention will be further described by way of example with reference to the accompanying drawings, in which.

Figure 1:
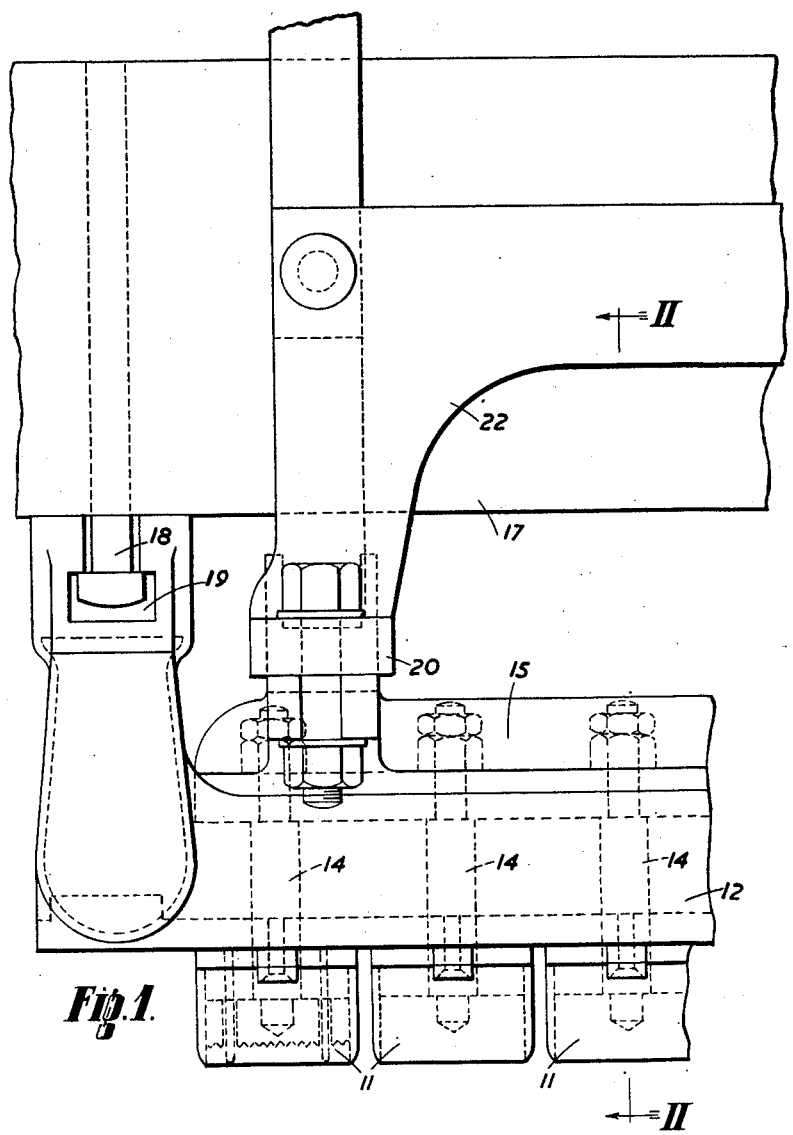
Fig. 1 shows a portion of a machine having a plurality of devices according to the invention.
Figure 2:
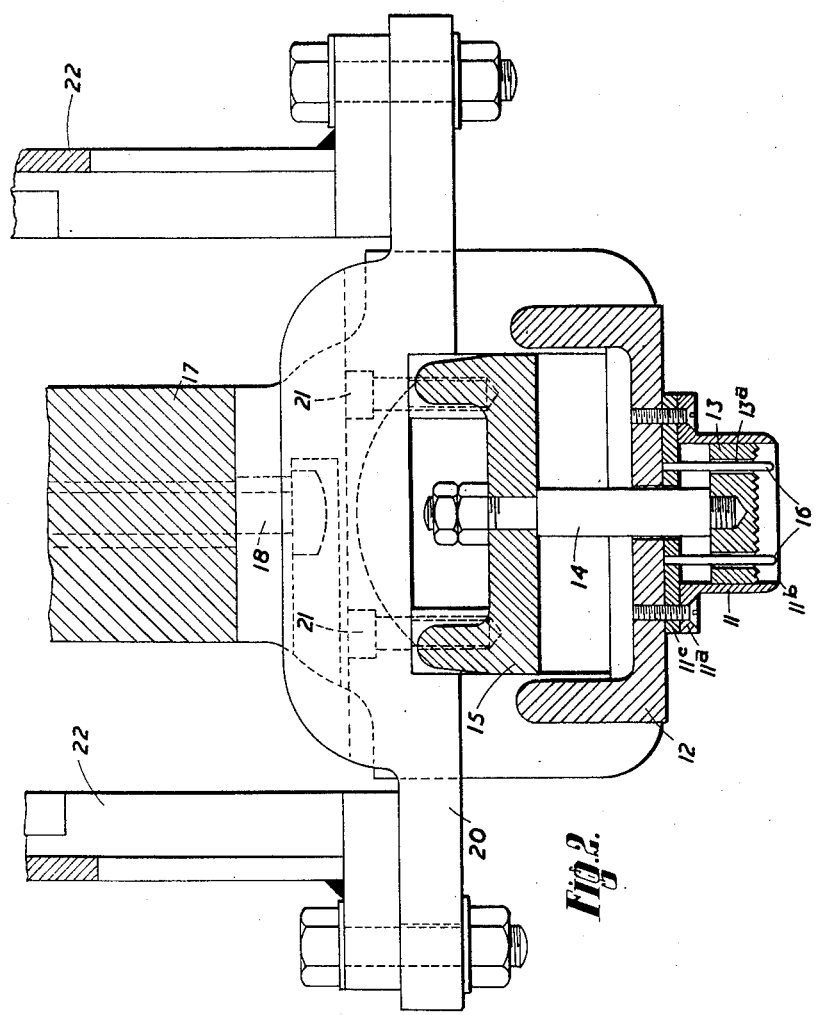
Fig. 2 is a section on the line II of Fig. 1.

A plurality of cutting shells 11 each having a flange portion 11a and a cutting edge 11b have also cylindrical end portions or false bottoms 11c interposed between the shell portion and an activating head 12. Shells 11 are bolted to the head 12 by bolts which pass through clearance holes in the flange portions 11a and the end portions 11c and are threadedly engaged in tapped holes in the head 12.

Embossing members 13 fit snugly within the shells 11 and are slidable therein. Each of the embossing members 13 has a detachable stud 14 of robust construction which passes through clearance holes provided in the end portions 11c and the head 12 and has its other end secured in a head 15.

The end portions 11c are provided with docker pins 16 which may be riveted to or threadedly engaged with the end portions in such a manner as to lie longitudinally within the shells 11. Apertures 13a are provided in the embossing members 13 through which the docker pins 16 may pass, being slidable therein whenever relative movement between members 13 and shells 11 takes place.

The head 12 is attached to a reciprocating machine member 17 by means of bolt or bolts 18, the heads of which lie in slots 19 in the head casting. The head 15 is attached to an intermediate member 20 by means of bolts 21 whilst flanged portions provided on the intermediate member 20 are bolted to a double-legged reciprocating machine member 22.

It is clear that the portion of the arrangement shown in Fig. 1 may be extended to any desired length within practical limits, the details of construction of its other termination being identical to the part shown with intermediate strengthening or bolting parts provided if required.

Figure 3:
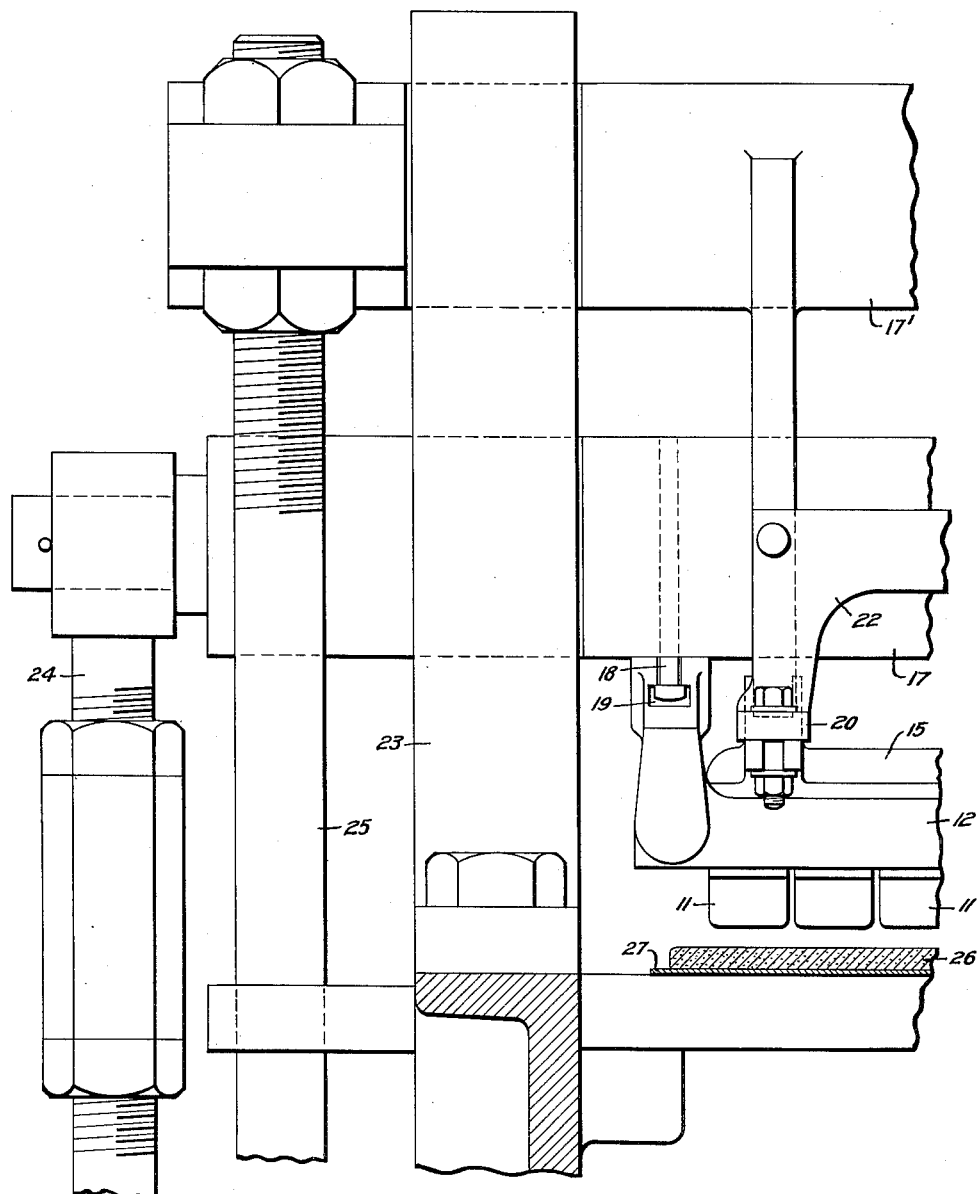
Fig. 3 shows a portion of a machine having a plurality of devices according to the invention and driving connections therefor.

The driving connections for the cutting shells and the embossing members are shown in Fig. 3. Standard 23 comprising a portion of the frame of the machine is slotted (not shown) to allow vertical reciprocation of the machine members 17 and 17¹. Member 17 is driven by a link 24 which is arranged vertically adjacent the standard 23 to be reciprocated by any conventional operating mechanism. Member 17¹ is driven by rod 25 also being reciprocated by an operating mechanism. As embossing members 13 are carried by machine member 17¹ and the cutting shells 11 are carried by machine member 17 reciprocation of the machine members by the link 23 and rod 24 causes movement of the embossing and cutting devices relative to dough web 26 on conveyor 27.

The operation of the machine is in accordance with the operation of known embossing machines. On the downward stroke, the embossing member 13 descends to a predetermined distance into the dough sheet to emboss the same. The shell 11, on the downward stroke follows after the embossing member to complete the cutting action after the embossing member has reached the bottom of its stroke and has commenced to move upwards. The embossing member rises before the shell, but is overtaken by the shell on the upward stroke so that the embossing member functions as an ejector. The mechanisms associated with the members 17 and 22 may, therefore, be of known type employed hitherto with embossing machines, and are not illustrated in the drawings.

The shells 11 need not necessarily be of circular form and indeed may be of any desired contour. In most cases the embossing member will have its outer perimeter identical with the inner form of the shell.

The end portions 11c provide light and easily removable means whereby the arrangement and numbers of docker pins may be altered either by having end portions with various numbers and arrangements of docker pins therein or alternatively by the provision of a number of tapped holes in a smaller number of end portions whereby the docker pins themselves may be interchanged. It is, of course, necessary to have embossing members with apertures corresponding to each arrangement of docker pins.

The term "embossing member" throughout the specification and claim is to be understood to mean a member capable of performing either the function of embossing alone or the function of embossing followed by the function of ejecting.

We claim:

In a machine for forming embossed articles from dough sheet and web material an improved combined embossing, cutting and ejecting mechanism including, a cutter head, a plate positioned below said head, a cutting shell having a laterally extending flange portion and a downwardly depending cutting edge, said cutting shell being detachably fastened to said cutting head by securing means passing through said flange portion and said plate whereby said plate forms a false bottom for said cutting shell, docker pins fastened to said plate to extend downwardly within said cutting shell, an embossing member disposed slidably within said cutting shell and having apertures to enable said docker pins to pass freely therethrough, an embossing stock positioned above said cutter head, a stud connecting said embossing stock and said embossing member passing through a longitudinal bore provided in said cutter head and the plate, and driving connections fastened to said cutter head and said embossing stock, whereby the cutting shell is driven to follow the embossing member on a downward stroke to cut the embossed article from dough sheet and web material and the embossing member is driven to follow the material and the embossing member is driven to follow the cutting shell on an upward stroke to eject the article from the cutting shell.

ALBERT APPLETON.
RICHARD ARTHUR COLLINGE.

REFERENCES CITED

The following references are of record in the file of this patent:

UNITED STATES PATENTS

| Number | Name | Date |
| --- | --- | --- |
| 475,280 | Jordan | May 17, 1892 |
| 1,076,384 | Mighiriah | Oct. 21, 1913 |
| 1,419,276 | Lentz | June 13, 1922 |
| 1,960,416 | Monks | May 29, 1934 |
| 2,158,594 | Seem | May 16, 1939 |
| 2,200,270 | Flores | May 14, 1940 |
| 2,230,778 | Flores | Feb. 4, 1941 |
| 2,446,201 | Turner | Aug. 3, 1948 |

FOREIGN PATENTS

| Number | Country | Date |
| --- | --- | --- |
| 101,218 | Germany | Jan. 24, 1899 |